United States Patent [19]
Redmann et al.

[11] Patent Number: 5,696,892
[45] Date of Patent: Dec. 9, 1997

[54] METHOD AND APPARATUS FOR PROVIDING ANIMATION IN A THREE-DIMENSIONAL COMPUTER GENERATED VIRTUAL WORLD USING A SUCCESSION OF TEXTURES DERIVED FROM TEMPORALLY RELATED SOURCE IMAGES

[75] Inventors: William G. Redmann, Simi Valley; Scott F. Watson, Glendale, both of Calif.

[73] Assignee: The Walt Disney Company, Anaheim, Calif.

[21] Appl. No.: 486,870

[22] Filed: Jun. 7, 1995

Related U.S. Application Data

[63] Continuation of Ser. No. 911,821, Jul. 10, 1992, abandoned.
[51] Int. Cl.⁶ ................................................. G06T 15/70
[52] U.S. Cl. ............................. 395/125; 395/130; 395/173
[58] Field of Search .................................. 395/125, 127, 395/130, 135, 152, 173, 960; 345/139

[56] References Cited

U.S. PATENT DOCUMENTS

| | | | |
|---|---|---|---|
| 4,645,459 | 2/1987 | Graf et al. | 395/127 X |
| 4,935,879 | 6/1990 | Ueda | 395/130 |
| 5,307,450 | 4/1994 | Grossman | 395/130 X |
| 5,333,245 | 7/1994 | Vecchione | 395/130 |

*Primary Examiner*—Mark K. Zimmerman
*Attorney, Agent, or Firm*—Mark D. Rowland; Michael J. DeHaemer; Fish & Neave

[57] ABSTRACT

Methods and systems for rendering and displaying in a real time 3-D computer graphic system a sequence of images of a subject using a plurality of time-sequenced textures such that at least a portion of the subject appears animated. The time-sequenced textures are derived from sources such as digitized frames or fields captured from a video recording of a live actor who may be engaged in a scripted performance, or a digitally-recorded cartoon animation sequence, and can be mapped in different ways to different types of surface geometries to achieve animation.

16 Claims, 4 Drawing Sheets

METHOD AND APPARATUS FOR PROVIDING ANIMATION IN A THREE-DIMENSIONAL COMPUTER GENERATED VIRTUAL WORLD USING A SUCCESSION OF TEXTURES DERIVED FROM TEMPORALLY RELATED SOURCE IMAGES

This is a continuation of application Ser. No. 07/911,821, filed Jul. 10, 1992, now abandoned, entitled METHOD AND APPARATUS FOR PROVIDING ANIMATION IN A THREE-DIMENSIONAL COMPUTER GENERATED VIRTUAL WORLD USING A SUCCESSION OF TEXTURES DERIVED FROM TEMPORALLY RELATED SOURCE IMAGES.

BACKGROUND OF THE INVENTION

This invention relates to a method and system for providing enhanced graphics in an interactive virtual world environment.

"Virtual reality" is a phrase that has been used to describe the experience of living or playing in a computer-generated environment which models a three-dimensional ("3-D") virtual space (i.e., a virtual world). In virtual reality systems, a viewer typically dons a set of goggle-mounted video screens or some other form of head-mounted display ("HMD"), and an audio headset, to block out the real world. Typically, the HMD is a conventional pixel (picture element) based, raster scan video display device. The viewer might also be provided with a simulated laser gun, a vehicle with accelerator and brake pedals, or some other device coupled to the computer system to enable the viewer to move about in, interact with or otherwise influence objects and characters in the virtual world. Sounds emanating from the virtual world (such as lasers firing or vehicles accelerating) are heard in the viewer's headset.

On the HMD the viewer sees images of virtual world scenes that are generated from a 3-D model of the virtual world by a computer graphic system. The scenes are displayed to the viewer as they appear from a specific position and orientation in the virtual world, called the "viewpoint" or "eyepoint." Usually, the viewer is given some degree of control over the position and orientation of the viewpoint, thus allowing the viewer to see different images from a plurality of different viewpoints.

By enabling the viewer to change the position and/or orientation of his or her viewpoint, the computer graphic system can create the illusion of the viewer "travelling" through the virtual world and looking in all directions. Depending on the capabilities and programming of the system, the viewer might be allowed to "travel" without restriction above, below and around a scene, as well as into or through structures, as though the viewer could fly or had other capabilities. The system might also be designed to constrain the motion of the viewpoint in various ways to achieve realism or to further the plot of a story being enacted around the viewer in the virtual world. For example, the viewer might only be allowed to position and orient the viewpoint no closer than six feet from the ground to simulate a view of the virtual world from the vantage of a person standing on the ground in the world. Alternatively or in addition, the viewpoint might be constrained from passing through the image of a solid surface (such as the wall of a building)—just as it is typically impossible in the real world to walk through the wall of a building. Also, the viewer might be constrained to move along a defined path, as though travelling on a train, such that a series of events can be enacted as the viewer's train passes by predetermined positions in the virtual world.

Virtual reality systems have developed from military and commercial airline flight simulators, and military tank simulators, in which computer graphic systems render a simulated, 3-D world from the perspective of a person looking out of an aircraft cockpit window or tank turret (i.e., the system's "viewpoint"). The world created by such simulators typically includes static structures and terrain (e.g., an airport with runways and buildings situated in a world including lakes, rivers and mountains), and moving objects (e.g., flying aircraft, land vehicles and clouds). The images of the simulated world displayed on the "windows" of the cockpit or turret continually change—as might occur in the real world—in response to changes in position and attitude of the aircraft or vehicle being "flown" or "driven" by the person participating in the simulation.

Virtual reality systems have applicability in the entertainment industry. Computer games and arcade machines presenting a virtual reality experience as a form of entertainment can provide a viewer with a high level of enjoyment. Virtual reality systems can immerse a viewer in a realistic world, or a highly fantasized or magical one where even the laws of physics have been skewed, to produce an entertainment experience available by no other means.

In conventional virtual reality systems, an image of a virtual world scene displayed to a viewer is typically created as follows. First, a library (or database) containing 3-D data representative of objects in the virtual world is created and stored, to be used in generating all images of the virtual world. Then, when an image of a virtual world scene is to be displayed from a particular viewpoint, the data in the library is processed to render objects within the viewer's field of view as a perspective image on a two-dimensional viewplane as they would appear to a viewer from that viewpoint. As used herein, "perspective image" means an image that is drawn such that volumes and spatial relationships in the image are depicted in accordance with what a person would see from the viewpoint if the virtual world scene were actually reproduced in 3-D space instead of on a 2-D viewplane (e.g., the size of an image of an object in the virtual world changes in inverse proportion to changes in distance between the object and the viewpoint).

One conventional technique used in virtual reality systems (and other computer graphic systems as well) for creating a library of 3-D objects is to model the objects by dividing each into one or more surfaces defined relative to a local coordinate system which can then be positioned relative to a fixed coordinate system (called the "world coordinate system"). These surfaces can be polygons or other geometric figures (e.g., spherical sections, bi-cubic patches) of various sizes and shapes configured to represent the shapes of objects in the virtual world. If a plurality of these polygons (or other geometric figures) are combined, substantially any 3-D shape can be modeled. Complex surfaces, including curved or perforated surfaces, can be piece-wise approximated using sufficient numbers of small polygons (or other geometric figures).

Realism and detail are added to a displayed image of a virtual world scene by texturing the modeled objects in the scene. Texturing gives the components of the displayed image patterned physical attributes. The surfaces of modeled objects are typically textured by generating 2-D arrays of scalar values ("texture maps") which represent features to be overlaid on the geometric figures that represent the visible surfaces. The combination of the geometric figures and overlaid texture map forms a composite which is displayed, pixel by pixel, on the viewer's video display device. Individual elements of a texture map may correspond on a one-to-one, many-to-one or one-to-many basis with pixels of the display device. Such a texture element is conventionally referred to as a "texel." Texture maps may include information defining one or more surface attributes such as color (represented, for example, by red, green and blue data elements), local deviation of the normal of the surface of the polygon (i.e. "bump maps," which simulate bumpy surfaces through illumination cues), local displacement along the normal of the surface, and luminosity. Further, a single map may contain multiple representations of the surface such as its appearance at different ranges (e.g., "MIP" maps) or different angles (e.g., a map containing images of an object as viewed from different compass directions such as NNW and East).

Several other techniques for modeling 3-D objects in a computer database are known. These include, for example, techniques based on representing the surfaces of the objects as mathematical functions or volume elements (conventionally called "voxels"). Such techniques tend to require more intensive arithmetic calculation than polygon-based modeling and are less commonly used today in conventional computer graphic systems.

Conventional computer graphic systems use various techniques for rendering a 3-D scene as perspective images on a two-dimensional viewplane from a 3-D database of modeled objects. Like the models themselves, these different techniques vary widely in the amount of computational complexity involved. A relatively simple technique, called "the painter's algorithm," is to render a pixel-based image of each object in the scene in its proper position, orientation and perspective according to the viewer's viewpoint, proceeding from the back of a scene to the front and "painting" the pixel data for objects in the foreground over that of previously drawn objects in the background. Another common technique, known as "z-buffering", involves writing for each pixel a "z" or range value which is used to resolve object priority. This technique is widely used in conventional computer graphic systems. Still another technique, known as "ray casting", is to render the scene image by projecting a straight ray backwards from the eyepoint through each pixel of the display to the first surface struck by each ray. As each ray intersects a surface, it accumulates the properties of the surface and adds them to the corresponding pixel. This technique requires more arithmetic calculation and is less commonly used than the painter's algorithm and z-buffering techniques. Other rendering methods, such as ray tracing and radiosity, have been developed to add shadows, diffuse lighting effects and reflections. These methods are capable of producing very realistic images, but require very large amounts of arithmetic calculation to do so.

The calculation required by many of these techniques may cause a conventional computer graphic system to take hours, if not days, to compute a single image. Accordingly, realism is usually severely constrained in images generated by conventional virtual reality systems, which must compute the images in "real time," meaning that images must be computed in a fraction of a second (e.g., at a rate of 10-60 frames per second) so that the viewer, and other objects, can move smoothly through the virtual world in approximately the same amount of time that they actually move in the real world.

A particularly detrimental aspect of the limited graphic realism of prior virtual reality systems is the inability of such systems to generate realistically animated human actors in the synthetic 3-D computer-generated environment. Especially important in this regard are fine details, such as facial expressions, and realistic movement of the images. In some 3-D computer graphic systems, articulated figures are generated using hierarchical 3-D models to display human actors. This type of animation, however, tends to appear "robot-like." Further, such animation is computationally expensive.

A related drawback of prior real time 3-D computer graphic systems that use texture maps is that they require the texture map patterns, like object geometry data, to be pre-computed and stored in a database of the 3-D graphics subsystem. In such systems, texture map patterns typically are not generated dynamically (this does not include and is in contrast to conventional techniques for rendering textures procedurally, i.e. techniques which compute a texture pixel-by-pixel at render time by evaluating some mathematical function). As a result, texture map patterns typically cannot be altered by a viewer, or changed in response to a viewer's actions (i.e., the texture map patterns are not interactive). Yet, it might be desired that a 3-D virtual world be populated with objects that simulate real world objects having surfaces which ordinarily change appearance in response to a person's actions, such as a computer console having a screen that displays different text or images responsive to a viewer's inputs at a keyboard.

In view of the foregoing, it would be desirable to be able to provide a computer graphic method and system which enhances a computer-generated, virtual reality environment with realistically animated human actors or other live beings or dynamic objects.

It also would be desirable to be able to provide a computer graphic method and system which enhances a computer-generated, virtual reality environment with dynamically generated textures.

SUMMARY OF THE INVENTION

It is an object of the present invention to provide a method and system for enhancing a computer-generated, virtual reality environment with realistically portrayed, animated photo-likenesses of real-world human actors or other live beings or dynamic objects, or cartoon animation.

It is also an object of the present invention to provide a method and system for applying dynamically generated textures to surfaces in a virtual reality environment.

In accordance with these and other objects of the present invention, methods and systems are disclosed for rendering and displaying in a real time 3-D computer graphic system a sequence of images of a surface with a plurality of time-sequenced textures such that at least a portion of the surface appears animated. Data representing a surface to be textured are stored in the computer graphic system. Also stored or generated dynamically are data representative of a plurality of time-sequenced textures (such as digitized frames or fields captured from a video recording of a live actor who may be engaged in a scripted performance, or a digitally-recorded cartoon animation sequence) to be applied to the surface. Based on the data representative of the surface and the data representative of subsequent ones of the plurality of textures, a sequence of images (such as a realistic, photo-likeness of a human being) then is displayed in real time on at least a portion of the surface, with the texture changing so that the image appears animated.

Animated textures can be displayed on planar and non-planar surfaces. Such surfaces may comprise one or a plurality of primitive geometric elements (e.g., polygons, bi-cubic patches, etc.). An illustrative embodiment is described in which an animated texture of a human face is applied to a virtual 3-D mannequin's head. An alternative embodiment is also described in which only a portion of the texture is animated, thereby allowing the eyes or mouth of the mannequin to be moved (and emphasized) by animation while the remaining parts of the textured face remain still. In either case, the geometry of the surface may change over time, such that a talking head may be transformed into a talking globe. As with a conventional static texture, the textures of the animation sequence stay aligned with the changing geometry.

To further enhance the realism of the animated image in the virtual world, actors are filmed from a position in the real world, and they translationally move in the real world, in a scaled analog fashion to what their position and translational movements will be in the virtual world relative to the viewpoint. Moreover, animated images can be made viewer-interactive by switching between different sets of stored or dynamically generated time-sequenced textures.

BRIEF DESCRIPTION OF THE DRAWINGS

A complete understanding of the invention and its advantages may be gained from consideration of the following detailed description, taken in conjunction with the accompanying drawings, in which like reference characters refer to like parts throughout, and in which.

DETAILED DESCRIPTION OF THE INVENTION

The present invention is described below in the context of an interactive 3-D computer graphic system embodiment that uses polygons and texel-based texture maps to render images. The particular techniques by which a library of polygon data and texture maps are generated, and by which 2-D images are drawn using these data, are not discussed with particularity in order to avoid unnecessarily encumbering the following discussion with a description of techniques that are conventional and well known to those skilled in the art. It will be readily understood by persons skilled in the art, however, that the present invention can be used with 3-D computer graphic systems which use voxel, spline (i.e. mathematical functions) or other surface modeling techniques, and which use painter's algorithm, Z-buffering, ray casting or other rendering techniques.

A conventional interactive 3-D computer graphic system typically includes at least two major subsystems: a graphics subsystem and a CPU subsystem. The graphics subsystem generates images and outputs the images to a display device. The CPU subsystem receives input from viewer interaction devices and describes to the graphics system what is to be displayed. The present invention is preferably implemented in a system having this type of system architecture.

Figure 1:
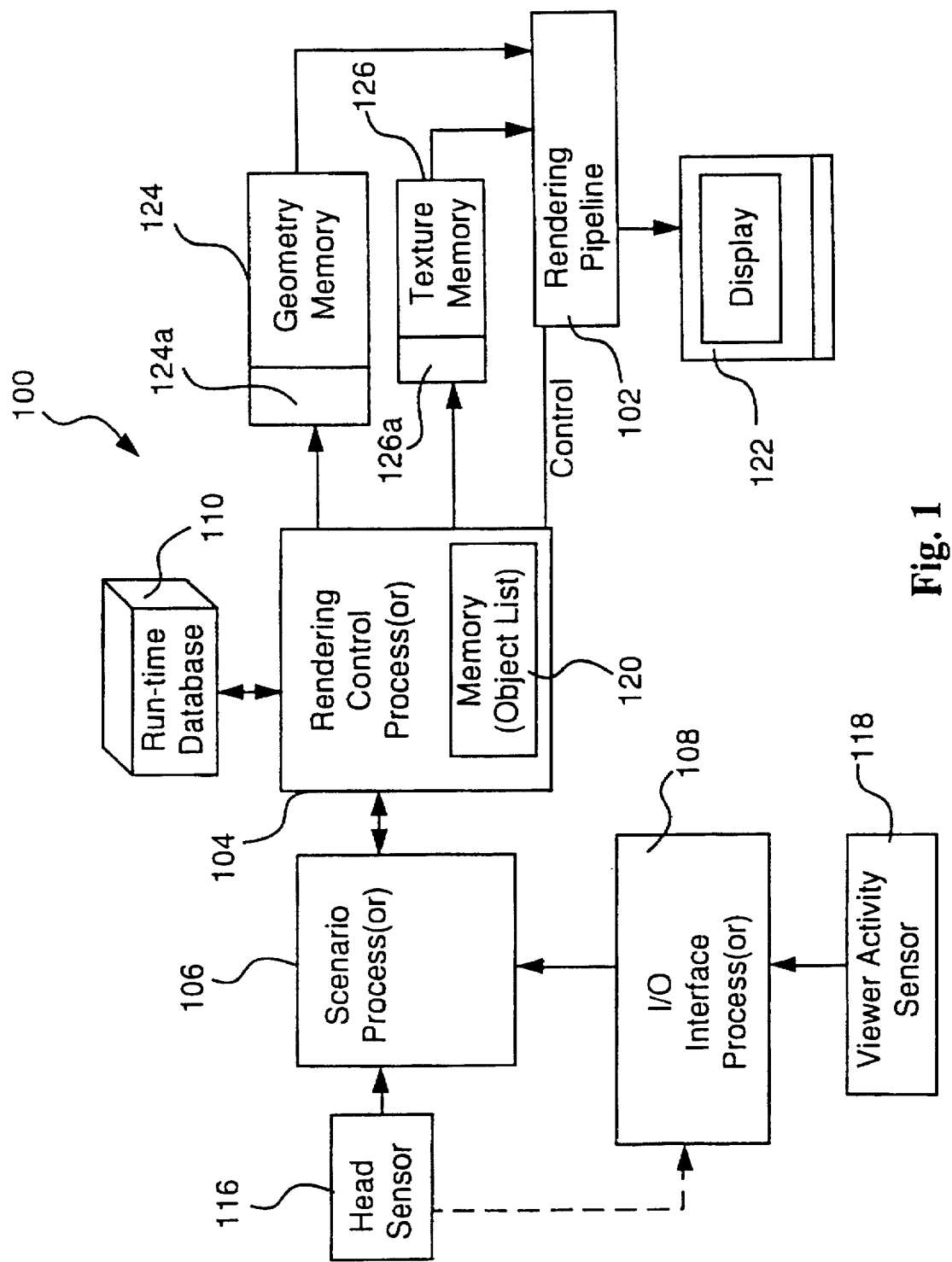
FIG. 1 is a simplified block diagram of an exemplary computer graphic system in which the graphics techniques of the present invention can be implemented.

FIG. 1 shows a simplified block diagram of an exemplary embodiment 100 of an interactive 3-D computer graphic system in which the present invention can be implemented. In system 100, the graphics subsystem comprises rendering pipeline 102 (with associated geometry memory 124 and texture memory 126) and rendering control process(or) block 104, and the CPU subsystem comprises scenario process(or) block 106 and I/O interface process(or) block 108.

Rendering pipeline 102 converts object data (e.g., polygon and texture data) into image data representative of the perspective view of virtual world scenes for particular viewpoints. The conversion process typically involves object geometry transformations, viewing transformations, clipping, rasterization and other conventional graphics processing operations. Rendering pipeline 102 is preferably implemented using a multiprocessing architecture to achieve high-speed rendering in accordance with conventional real time computer graphics techniques.

In accordance with such conventional techniques, rendering pipeline 102 calculates the pixel data for an image by rendering surfaces representative of virtual-world objects within the viewer's field of view. The surfaces typically comprise three- or four-sided colored polygons, any of which is capable of being textured or smoothly shaded, and modeled as transparent or semi-transparent (translucent). A fully transparent surface would, when rendered, be invisible in the display, while a semi-transparent surface would visibly obscure (but not completely occlude) a background. The polygon and texture data on which rendering pipeline 102 operates reside respectively in geometry memory 124 and texture memory 126.

Polygon data are stored in geometry memory 124 in a plurality of hierarchical data structures defining various object geometries. These object geometries may range in size from one polygon (representing, e.g., a very simple virtual world entity, or object) to thousands of polygons (representing, e.g., a portion of a complex terrain model covering hundreds of square miles of scenery or an elaborate architectural model).

Texture data are stored in texture memory 126 usually in the form of rectangular texture maps. Each rectangular texture map in texture memory 126 possesses its own two-dimensional coordinate space, conventionally referred to as a "u,v" space or texture space. These texture maps conventionally comprise digitized images that are mapped onto surfaces defined by the polygon data in geometry memory 124. Various algorithms are known for performing image transformations of this type. For example, a texture can be mapped to a polygon in geometry memory 124 by associating with each vertex of the polygon a (u,v) coordinate of a particular texture map, and linearly interpolating (u,v) coordinate values for intermediate points across the polygon surface. Other, more sophisticated "projection" algorithms have been developed and are conventionally used to transform the (u,v) coordinates of texels in a texture map to coordinates on a 3-D object surface. As will be readily apparent, the graphics techniques of the present invention can be used with substantially all such mapping algorithms.

At the tail end of rendering pipeline 102, image data are converted to video signals which are provided to display 122. Display 122 may comprise a head-mounted display device and/or a non-encumbering device such as a free-standing or wall-mounted monitor. In either case, the display device may be a direct-view or projection type device. The present invention also can be used with 3-D displays as well, such as multi-planar and stereo pair displays. For high quality entertainment, it is important that the viewer's display device have a suitably high number and density of pixels, and that rendering pipeline 102 be capable of providing imagery of like resolution. A display of 1000 (horizontal) by 800 (vertical) pixels provides a preferable image although, of course, a greater or lesser pixel density may be used.

Rendering pipeline 102 operates under the control of rendering control process(or) block 104. More particularly, during run time rendering control process(or) block 104 controls the loading of data into geometry memory 124 and texture memory 126 and the timing of rendering cycles of rendering pipeline 102. Geometry memory 124 and texture memory 126, which preferably comprise high-speed electronic memories, ordinarily do not store the polygon and texture data for an entire virtual world. Instead, the data loaded into these memories are usually selected from a larger run-time database stored on a secondary storage device and transferred into geometry memory 124 and texture memory 126 as needed to render objects within the visible range of the viewer. This selection process is normally the responsibility of rendering control process(or) block 104, which selects the data based on commands or procedure calls from scenario process(or) block 106 describing the scene to be rendered. Rendering control process(or) block 104 keeps track of the objects in the scene by maintaining a list of information for each object, such as its current position, orientation and status. The list also includes for each object a pointer 216 to a particular object geometry that is to be used to render the object. This list is maintained in a memory 120 in rendering control process(or) block 104.

In many conventional computer graphics systems, the run-time database is stored on an external secondary storage device, as illustrated in FIG. 1 by run-time database 110. In this arrangement, rendering control process(or) block 104 is usually directly burdened with the task of moving data from the database to the electronic memories of geometry memory 124 and texture memory 126 during run-time. Some, or all, of this burden can be relieved by providing geometry memory 124 and texture memory 126 with internal secondary storage devices coupled to the electronic memories by dedicated DMA channels. The internal secondary storage devices (e.g., disk drives) may store part or all of the geometry and texture data needed for a particular virtual world, and are operated by conventional DMA controllers under the control of rendering control process(or) block 104. In FIG. 1, such devices and their associated DMA controllers are shown as blocks 124a and 126a.

As previously mentioned, scenario process(or) block 106 controls the image generated by the graphics subsystem by issuing commands or procedure calls to rendering control process(or) block 104 to describe a particular scene. Some of these commands or procedure calls specify the attributes and placement of objects in the scene, while others specify the viewpoint and other aspects of the image. These commands or procedure calls are issued based on instructions contained in a control program which scenario process(or) block 106 executes. Viewpoint is determined by scenario process(or) block 106 from viewer interaction data provided by I/O interface process(or) block 108.

The viewer interaction data provided by I/O interface process(or) block 108 may include data from one or more input devices. Such devices may include, for example, a viewer head sensor 116 for tracking the position and orientation of a viewer's head and viewer activity sensors 118 for receiving inputs from the viewer indicative of a desired direction and rate of travel through the virtual world. Conventional sensing devices of various well-known types can be used to implement these sensors. For instance a suitable head tracking device called "the Bird" is commercially available from Ascension Technology Corp., of Colchester, Vt.

As shown in FIG. 1, position and orientation data from viewer head sensor 116 alternatively may be coupled directly to scenario process(or) block 106 to minimize data transport delay. This configuration is preferred because, as will be discussed below, it is important that scenario process(or) block 106 have the most current information available as to the position/orientation of the viewer's head when directing the graphics subsystem. Thus, delay is avoided by bypassing I/O interface process(or) block 108.

The architecture of FIG. 1 is substantially typical of numerous conventional interactive 3-D computer graphic systems. In such systems, rendering pipeline 102 and process(or) blocks 104, 106 and 108 are implemented in various ways using general purpose and/or specialized computer hardware. For example, separate computers, or separate processors within a multiprocessor computer, may be used for each block. Alternatively, two or more of the blocks may run as parts of the same process, or as different processes on a common processor. The present invention can be used in substantially any of these implementations.

In a preferred embodiment, at least the graphics portion of system 100 (i.e. rendering pipeline 102 and rendering control process(or) block 104), and most preferably system 100 in its entirety, is implemented using a specialized computer hardware device of the type commonly referred to as an "image generator". Image generator devices are commercially available from many companies, including: Ball Systems Engineering Division, of San Diego, Calif.; Bolt, Branek, Newman of Redland, Wash.; Division Ltd. of Bristol, England; Evans & Sutherland Computer Corporation ("E&S") of Salt Lake City, Utah; G.E Aerospace Simulation and Control Systems Department of Daytona Beach, Fla.; and Silicon Graphics, Inc. of Mountain View, Calif. An image generator having two separate channels for producing video outputs is particularly preferred. Such hardware can be used to render two views of an image from slightly different viewpoints (e.g., 3" apart) at approximately the same time to provide a stereoscopic HMD display. However, a single channel image generator is also sufficient for producing a high quality monoscopic display. Multiple channel devices also can be used to provide multiple viewers with different concurrent views of the same virtual world. Of course, sufficiently powerful general purpose computers could be used instead of a special purpose image generator without departing from the principles of the present invention.

Communication among rendering pipeline 102 and process(or) blocks 104, 106 and 108 must be accomplished at high speed to properly effect a real time system. Substantially any conventional high-speed communication technique can be used, although the choice of technique largely depends on the particular manner in which the process(or) blocks are implemented. As one example, Ethernet can be used as in conventional computer graphics systems to communicate between different computers. A preferred technique is to use shared memory (i.e., a memory space that is addressable by each process(or) block to which it is coupled as though the memory space were part of the main memory of the respective process(or) block). If the process(or) blocks of system 100 are implemented using different computer devices, substantially any commercially available dual port shared memory card which suits the purpose of the memory (such as bus adapter products of Bit3 Computer Corporation of Minneapolis, Minn.) can be used to communicate between the computers.

A shared memory space can be divided into multiple portions having different configurations designed to serve different purposes. For example, circular buffers or other queuing configurations can be used to send control and status messages between process(or) blocks. This permits asynchronous communication between process(or) blocks and prevents loss of an important command or message if one process(or) block momentarily becomes too busy to keep up with communications from the other.

In addition, individually addressable memory mapped "mailboxes" can be used for communicating data that are repeatedly updated. For example, each time I/O interface process(or) block 108 receives position data from viewer activity sensors 118, the data can be stored by I/O interface process(or) block 108 into a designated mailbox in a memory shared by scenario process(or) block 106 and I/O interface processor block 108. When updating such position data, I/O interface process(or) block 108 overwrites whatever data was previously stored in the mailbox. Ordinarily, scenario process(or) block 106 reads the data in the mailboxes between updates. However, if scenario process(or) block 106 becomes too busy to do so, and thus misses a particular update, the overall average rate at which the data are updated and read is sufficiently high that the missed update is not significant.

As another example, memory 120 also can be implemented as a shared memory, such that scenario process(or) block 106 has direct access to an object list (maintained in memory 120) used by rendering control process(or) block 104 to keep track of objects. This implementation allows scenario process(or) block 106 to modify the scene to be rendered by the graphics subsystem by directly changing data in the object list.

Figure 2:
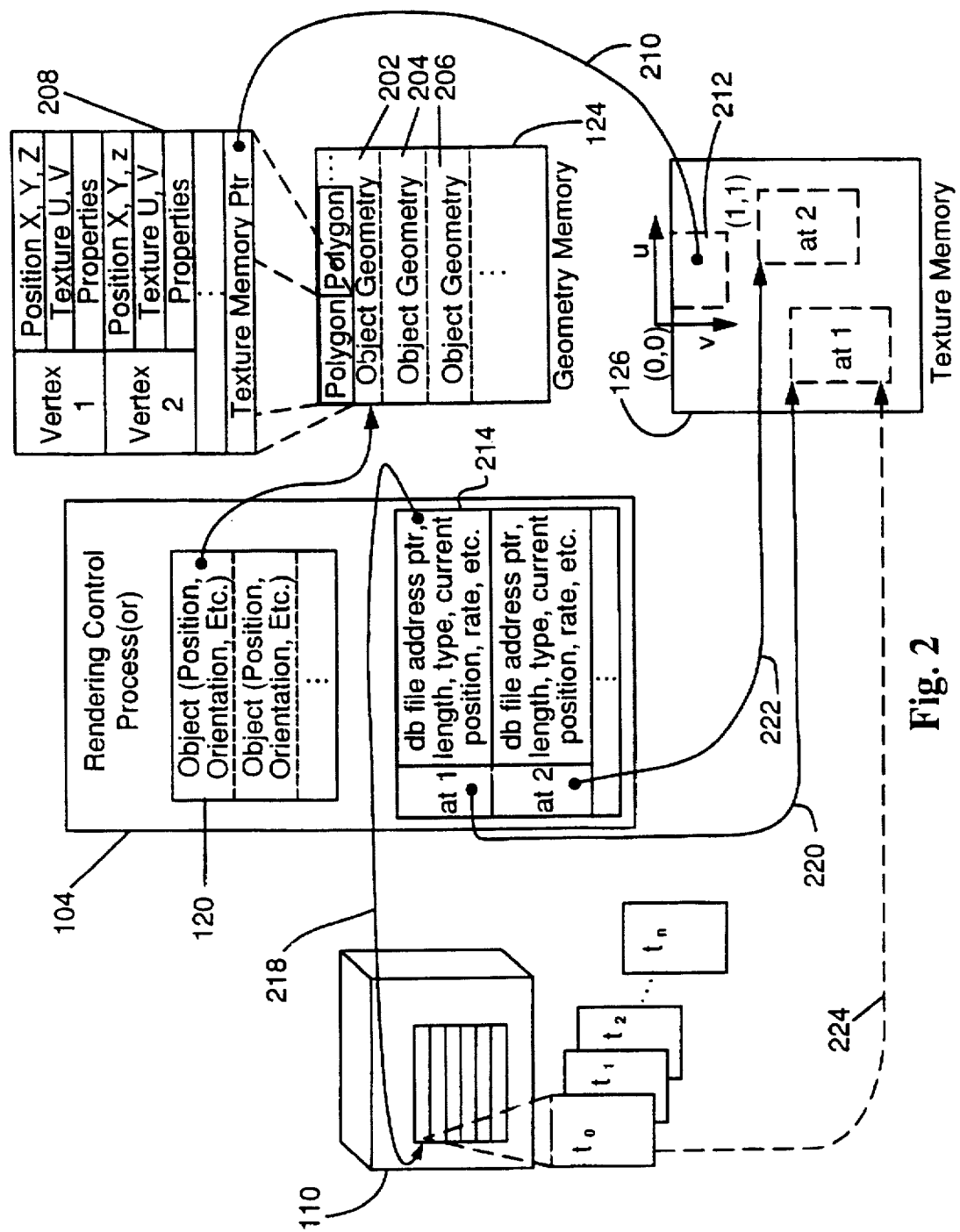
FIG. 2 shows how textures can be interchanged in the (u,v) coordinate texture space of the computer graphic system of FIG. 1 in accordance with the present invention.

FIG. 2 shows an exemplary implementation of the present invention in system 100 of FIG. 1. In FIG. 2, geometry memory 124 is shown as containing a plurality of object geometry data structures 202, 204, and 206. The object geometries include data defining the surfaces, in this case polygons, comprising the respective objects. A typical polygon definition includes data defining the vertices of the polygon, as shown in FIG. 2 by the expanded polygon definition 208. Each vertex definition of a polygon to be textured includes a coordinate (x,y,z) in object space and a corresponding coordinate (u,v) in texture space (i.e. in the texture map to which the polygon is associated). A vertex definition may also include properties such as color and luminosity. Further properties that can be defined for a polygon are the type of texture to be associated with the polygon (e.g., full color), if any, and the manner in which the texture is to be mapped to the polygon (e.g., the mapping algorithm to be used).

In accordance with the present invention, realistic animation is provided in a computer-generated 3-D world by interchanging a time-sequenced set of textures on a rendered surface. One way in which this can be accomplished in system 100 is by associating a polygon to be textured with a particular memory location address within texture memory 126 which is used as a common reference point for the (u,v) coordinate systems of a plurality of time-sequenced texture maps sequentially transferred into texture memory 126. The time-sequenced texture maps can be transferred from a run-time database stored in an external secondary storage device (e.g., run-time database 110) or a texture database stored in an internal secondary storage device such as storage unit 126a. The memory address used as a common reference point may correspond, for example, to the memory location at which the origin of the (u,v) coordinate system for each of the maps is to be located. At arbitrary or periodic times between rendering cycles of the rendering pipeline 102, different ones of the plurality of texture maps are written into the same (u,v) coordinate space within texture memory 126 using the common reference point to position and orient the (u,v) coordinate system of each map. When applying texture to the polygon, rendering pipeline 102 uses whatever texture data is in the (u,v) coordinate space associated with the polygon, and maps that texture data to the polygon (e.g., in accordance with the (u,v) coordinates assigned to the vertices of the polygon) by the polygon's definition in the object geometry. Different sized maps can be included in the time-sequenced set of textures by normalizing the (u,v) coordinate systems of the texture maps.

Various methods can be used to associate a polygon to be textured with a particular area in texture memory for purposes of associating the polygon to a particular (u,v) coordinate space. For example, as part of the object geometry information which is generated to define the polygons forming an object, each polygon to be textured may include a pointer 210 that directly addresses a memory location in texture memory 126 (as shown by polygon definition 208 of FIG. 2). Alternatively, the pointer may address a particular area in texture memory 126 indirectly by pointing to a map number in a memory-resident look-up table which correlates the map number with a memory location in texture memory.

In the system of FIG. 1, the process of interchanging texture maps during run time preferably is managed by rendering control process(or) block 104 under the direction of commands or procedure calls from scenario process(or) block 106. The specific implementation of a texture memory management system in accordance with principles of the present invention is a designer's choice and may vary from one computer graphic system to another depending on the architecture of the particular system. For example, rendering control process(or) block 104 may be primarily responsible for much of the "bookkeeping" involved in transferring texture maps from run-time database 110 or storage unit 126a into texture memory 126, in which case scenario process(or) block 106 may need only to tell rendering control process(or) block 104 the name of a particular texture that is to be applied to a particular surface. Rendering control process(or) block 104 would, in response to such a command or procedure call, correlate the texture name to a particular texture file in run-time database 110 or storage unit 126a using a memory-resident cross-reference table, and then transfer the texture map in that file to the location in texture memory 126 identified (either directly or indirectly) by a pointer associated with the geometry for the surface specified in the command or procedure call (e.g., a pointer included in the object geometry stored in geometry memory 124).

Alternatively, the bulk of such bookkeeping overhead involved in managing the texture memory can be transferred from rendering control process(or) block 104 to scenario process(or) block 106. This can be accomplished, for example, by providing scenario process(or) block 106 with file references and file location data for texture files in run-time database 110 or storage unit 126a (e.g., during initialization of the computer graphic system). Scenario process(or) block 106 may then issue commands to rendering control process(or) block 104 during run time which instruct rendering control process(or) block 104 to transfer a specific texture map from a specific file location in run-time database 110 or storage unit 126a to a specific area in texture memory 126, using the identifying information previously provided during initialization.

This transfer to scenario process(or) block 106 of control over texture memory management may be necessary, or at least preferable, in some implementations because of limitations in the processing capability of the rendering control process(or) block of a conventional graphics subsystem. For example, rendering control process(or) block 104 may simply be too busy managing object geometries to perform the bookkeeping operations involved in managing the transfer of textures between run-time database 110 or storage unit 126a and texture memory 126. In such implementations the software of rendering control process(or) block 104 can be modified to transfer texture memory management to scenario process(or) block 106, which may have more available data processing capacity. Such modifications are within the skill of persons of ordinary skill in the art conversant with the software of the particular graphics subsystem used.

In implementations where scenario process(or) block 106 is given ultimate control over management of texture memory 126, the control program executed by scenario process(or) block 106 will include instructions telling scenario process(or) block 106 when to issue commands to rendering control process(or) 104 to load texture data into texture memory 126. In such an implementation, it is therefore the responsibility of the programmer to ensure that the appropriate textures are loaded into texture memory 126 for a particular virtual world scene.

The texture maps that are transferred into texture memory 126 in accordance with principles of the present invention can, but need not, be pre-computed and compiled as part of a stored run-time database. In accordance with another aspect of the present invention, such textures may be transferred into texture memory 126 from a source other than a stored run-time database, thus permitting textures to be generated dynamically (i.e. apart from and before or after the compilation of the run-time database).

For example, texture data may be provided by scenario process(or) block 106 as part of a command or procedure call to rendering control process(or) block 104. These data may be stored in texture memory 126 by rendering control process(or) block 104 in the same manner as texture data taken from run-time database 110. A shared memory arrangement can be used to avoid bottlenecks in the command stream between blocks 104 and 106. Alternatively, dynamically generated texture data may be fed directly into texture memory 126 using an alternative path, such as a dedicated data bus coupling texture memory 126 to an external texture data source.

Further, these texture data can be generated or modified at any time prior to their transfer into texture memory 126. If desired, such textures can be generated or modified in real time. Thus, the texture data which are transferred into a particular position within texture memory 126 (and thereby associated any one or more geometry surfaces which reference that position) in accordance with principles of the present invention can be wholly generated, or modified, in response to an action of the viewer to provide a display of one or more interactive texture patterns. The texture pattern can be drawn by scenario process(or) block 106, I/O process (or) block 108, or another computer, such that dynamically changing computer-generated text and/or graphic images, or digitized video, can be introduced as textures.

Thus, when rendering control process(or) block 104 receives a command from scenario process(or) block 106 to load a particular texture map into texture memory 126, rendering control process(or) block 104 retrieves the texture map from run-time database 110 or storage unit 126a in accordance with file reference information provided in the command and stores the texture map into texture memory 126 at the memory location specified in the control header of the texture map. This same memory location is addressed (directly, or indirectly using the above-mentioned look-up table) by the texture memory pointer(s) of the polygon(s) to which the texture is to be applied, as shown for example by arrow 210 in FIG. 2. (Arrow 210 illustrates a texture memory pointer in a polygon definition within object geometry 202 pointing to an address in texture memory 126 corresponding to the origin of a rectangular (u,v) texture coordinate space 212).

In FIG. 2, a plurality of time-sequenced textures stored in run-time database 110 are illustrated as textures t0, t1, t2, t3 . . . tn. Depending on the type of texture being animated (e.g. the number of colors in the texture), each of textures t0 . . . tn may include one or more texture maps. For example, in the preferred embodiment each of textures t0 . . . tn is composed of four maps: red, green, blue, and alpha (transparency). A plurality of different texture animations can be run concurrently in system 100 by assigning different sets of time-sequenced textures to different areas in texture memory 126. Rendering control process(or) block 104 maintains a memory-resident table 214 of control information relating to each pending texture animation. Rendering control process(or) block 104 uses this table to keep track of the animations. As shown in FIG. 2, table 214 includes information such as: the length of the animation (e.g., the number of images in the animation sequence), the type of animation (e.g., whether the animation is a continuous loop which runs from beginning to end and then repeats, or a reversing sequence which runs from beginning to end, end to beginning, etc.), the current position in the animation (e.g., the image in the sequence currently being displayed), etc. In addition, as shown in FIG. 2, table 214 also includes texture file pointers (such as 218) and pointers into the texture memory (such as 220 and 222) correlating animated texture file addresses in run-time database 110 with respectively assigned areas at1, at2, etc. in texture memory 126.

Prior to starting an animation, rendering control process (or) block 104 receives a command from scenario process (or) block 106 instructing rendering control process(or) block 104 to load a particular animation sequence into a selected areas in texture memory 126. The command is generated by scenario process(or) block 106, and is issued responsive to an executed instruction of the control program in its main memory. The command identifies the beginning address of each file in the run-time database comprising the desired animation sequence. This information is provided to scenario process(or) block 106 when, as part of the process of loading run-time database 110, rendering control process (or) block 104 emits the file references and location data for all texture files in run-time database 110 or storage unit 126a to scenario process(or) block 106. Responsive to this command, rendering control process(or) block 104 loads the database file address(es) into the proper pointer location(s) within table 214.

In response to a subsequent command from scenario process(or) block 106 instructing rendering control process (or) block 104 to start the animation (which command may immediately follow the load command), rendering control process(or) block 104 transfers the first texture map from run-time database 110 or storage unit 126a into texture memory 126 as shown by dotted line 224. Assuming that an object data structure stored in memory 120 has been assigned an object geometry which includes a polygon that points to the area of texture memory 126 into which the first texture has been loaded, and that the position and orientation of the polygon is such that it is within the viewer's field of view, rendering pipeline 102 renders the polygon with the first texture of the animation in the same manner as it would a conventional texture. Thereafter, rendering control process (or) block 104 automatically transfers subsequent texture maps in the animation sequence from run-time database 110 or storage unit 126a into the same area of texture memory 126, and the polygon is rendered with each such texture. This process can be repeated to display the entire animation sequence, or any desired portion of that sequence. The rate at which the textures are transferred to texture memory 126, and thus the rate at which they are rendered, is chosen to provide smooth animation. As discussed below, this rate typically need be only a fraction of the update rate of the graphics subsystem. For example, in a preferred embodiment the texture is changed at a 10 Hz rate—i.e., once every six times that the graphics subsystem redraws the image of the polygon on which the texture is displayed.

Using the above method, animated textures can be applied to substantially any displayed polygon in a scene, including polygons forming surfaces of static or moving objects. With careful and coordinated use of conventional object management and animation choreography techniques, scenario process(or) block 106 can be caused to synchronize the motion and attitude of a moving object with an animated texture displayed on one or more of its surfaces.

In lieu of, or in addition to, the above-described technique of sequentially transferring texture maps into a designated area in texture memory, other techniques can be used to provide texture animation in accordance with principles of the present invention. For example, although it is convenient to implement texture animation by sequentially transferring time-sequenced textures into the same area in texture memory using a particular texture memory address as a common reference point for aligning the u,v coordinate spaces of the time-sequenced textures, it is not necessary that time-sequenced textures within a set be stored in the same area in texture memory 126. If desired, time-sequenced textures can be sequentially transferred into different areas in texture memory as long as the different areas are appropriately associated at render time with the surface on which the animation is to be rendered. Such flexibility can be added to system 100 by having rendering control process(or) block 104 or scenario process(or) block 106 change the texture memory address value of the appropriate polygon texture memory pointer during run-time to reflect a change in the texture memory area in which a time-sequenced texture to be applied to the polygon has been stored. Alternatively, if a texture memory pointer references indirectly through a memory-resident look-up table as previously described, the polygon definitions pointer can be left unchanged and the texture memory address in the table can be changed appropriately.

Also, given sufficient texture memory size, the textures comprising a time-sequenced texture set can be stored concurrently in different areas of texture memory instead of being sequentially transferred into texture memory. In this case, animation is provided by periodically changing the area of texture memory addressed by the texture memory pointer of a polygon to render the polygon with the textures of the set in time-sequenced order, either by changing the value of the pointer itself (if the pointer directly addresses the texture memory) or a memory-resident index table to which the pointer refers.

In another exemplary embodiment, texture animation is achieved using pointer 210 by periodically offsetting the mapping of a polygon geometry to the u,v coordinate space of a texture map containing a plurality of time-sequenced images within the same texture map. More particularly, an area of texture memory 126 may be pre-loaded with a number of time-sequenced image frames tiled into a single u,v texture space. When rendering a polygon associated with this texture space, the vertices of the polygon are transformed from object space coordinates into texture space coordinates by indexing an offset (du,dv) in the u,v coordinate system. This indexing preferably executes a raster pattern by indexing in a row-wise or column-wise sequence.

If access to pointer 210 is unavailable in a particular image generator or the handling of pointers to change textures is not fast enough for some architectural reason, the invention still may be implemented by manipulation of pointer 216. In this alternative embodiment of the invention, texture animation can be implemented by associating a polygon of different ones of object geometries 202, 204, 206 etc. with different ones of time-sequenced textures t0, t1, t2, etc. loaded into texture memory 126. To achieve texture animation with this embodiment, pointer 216 would be used to sequentially point an object in the object list maintained by memory 120 to different ones of object geometries 202, 204, 206 etc. Different polygons would thus be sequentially rendered, each having a different applied one of the time-sequence of textures. The net effect would be that a plurality of time-sequenced textures would be displayed, the textures mapped onto different polygons, to create the texture animation.

Yet another way to provide texture animation, in the event that pointer 216 is not available or cannot be manipulated fast enough, is to identify a plurality of objects in the object list maintained by memory 120 each associated by a pointer to a different one of object geometries 202, 204, 206, etc. each of which, in turn, has a polygon associated with a different one of textures t0, t1, t2, etc. loaded into texture memory 126. To display a texture animation sequence, the sequence of objects would be rendered at the appropriate texture animation rate. As with the previously described embodiment, the net result would be that different polygons would be sequentially rendered, each having a different applied one of the time-sequence of textures, to create the texture animation.

In addition, texture animation can be implemented such that only a portion of a texture is time-sequenced. For example, instead of sequentially transferring a set of full time-sequenced textures into a particular texture space, smaller time-sequenced textures can be sequentially transferred into a given portion of that space to overwrite only a section of a larger texture residing there. The small textures can be aligned by associating them with a common reference point within the larger texture. Thus, any particular section of a texture can be selectively animated. Further, responsive to a viewer action detected by viewer head sensor 116 or viewer activity sensors 118, scenario process(or) block 106 can command rendering control process(or) block 104 to switch between different sets of stored or dynamically generated time-sequenced textures when sequentially transferring textures into a particular texture space in texture memory 126, thus providing interactive animation.

Figure 3:
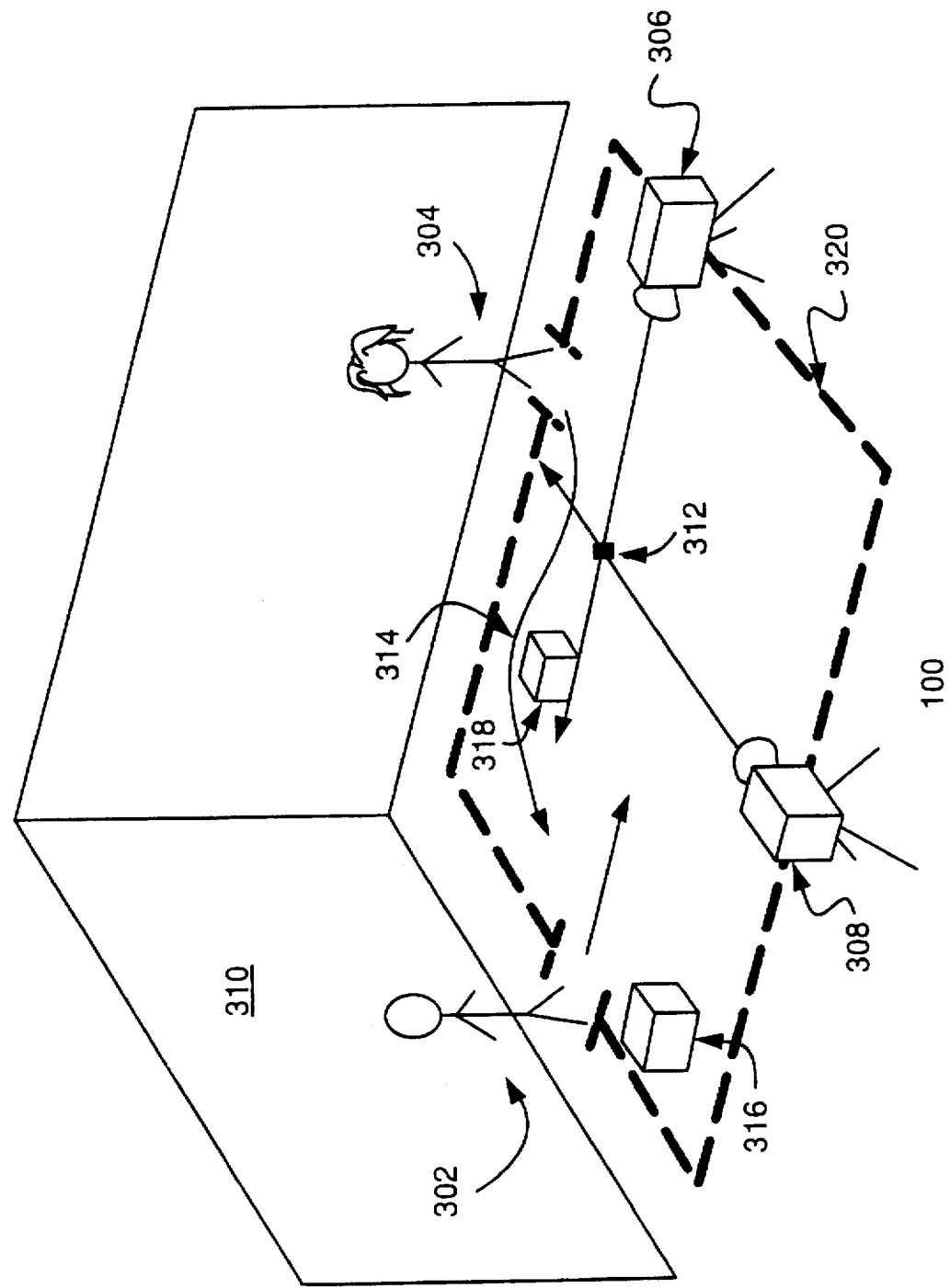
FIG. 3 shows an exemplary method by which a scripted performance of a live actor or other entity physically existing in the real world may be captured on a video recording to create animated textures for use with the present invention.
Figure 4:
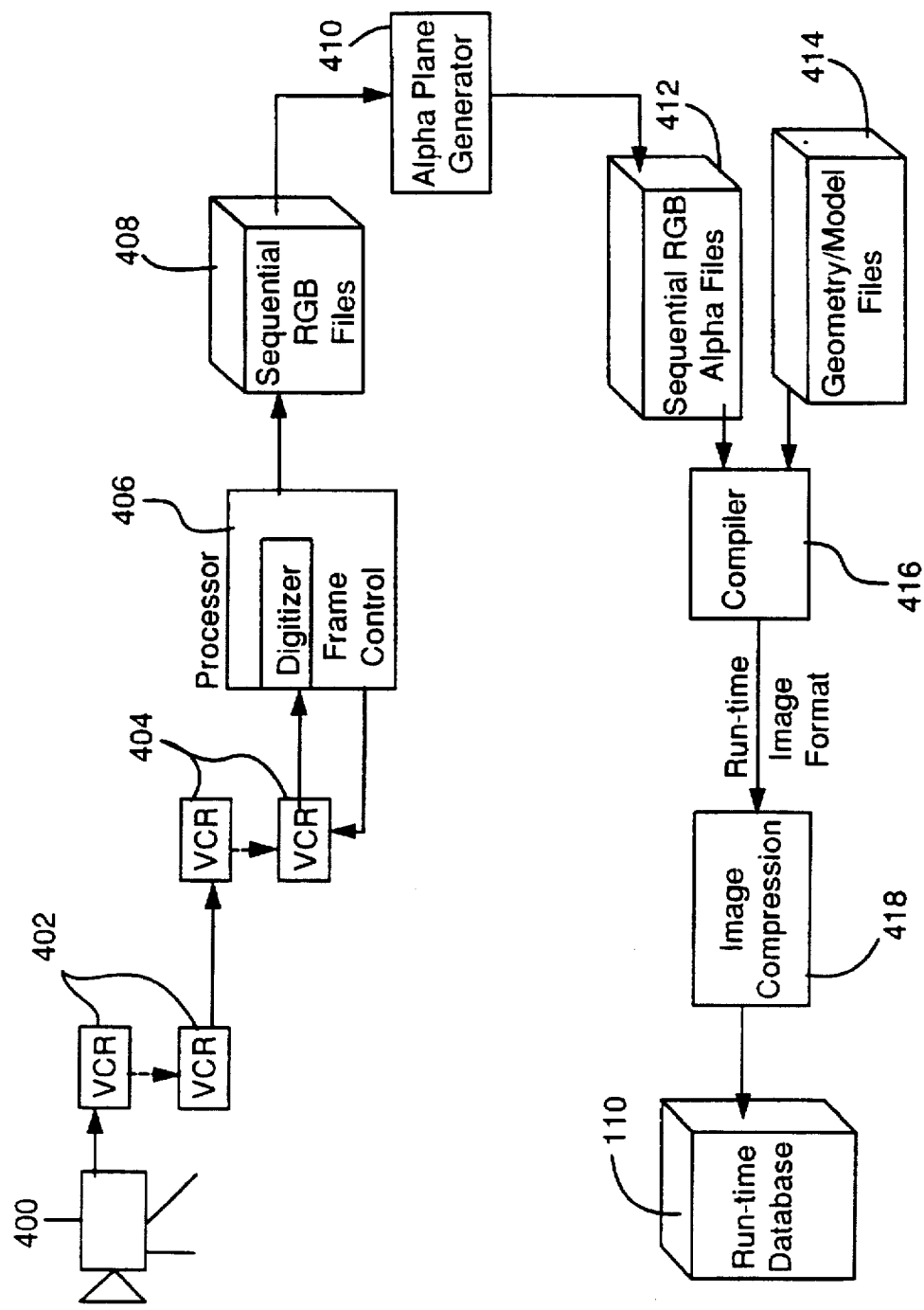
FIG. 4 is a block diagram illustrating a method for generating data representative of a time-sequenced plurality of textures from a video recording of an entity or event in the real world in accordance with principles of the present invention.

The sourcing and generation of time-sequenced textures are illustrated by FIGS. 3 and 4.

FIG. 3 shows an exemplary method for introducing realistically animated characters into a virtual world by scripting and recording an event or act performed by a person in the real world which, in accordance with principles of the present invention, is to be re-enacted in the virtual world by a photo-realistic likeness of the actor. Assume that a scene in the virtual world requires a man and a woman to enter a square room each through a different doorway located respectively midway along adjacent walls of the room. The viewpoint of the person who will be viewing the scene in the virtual world is known, or assumed, to be at a specific position in, or in a general area of, the room. Assume also that the man is to walk into the room toward its center, and the woman is to walk in an arc around the room toward the doorway through which the man entered. The analog of these events are performed in the real world by male and female actors 302 and 304 before video cameras 306 and 308. Realism in the virtual world is best, and preferably, achieved by properly scaling the movements of the human actors at the time of recording to the dimensions of the virtual world scene into which the animated likenesses of the actors are to be inserted as textures.

Accordingly, as shown in FIG. 3, the actors are provided with markers, such as tape on the floor, delineating the positions of doors and walls of a room dimensioned in accordance with the dimensions of the room to be modeled in the virtual world. Such markers may be provided in other positions as well, or the ceiling for example, and preferably outside of the view of the cameras. A variety of backgrounds also may be used. If it is desired that the texture to be displayed in the virtual world is the likeness of an actor against a particular background scene that cannot easily be modeled in the virtual world, the background scene can be incorporated into the texture by representing the background scene on a wall 310 behind the actor when recording the actor's performance by cinematography or videography. Alternatively, the wall may be a conventional "blue screen" of the type used in ordinary video production to provide a background that can be changed in a video switching process commonly referred to as chroma-keying. This process is often used in broadcast television, for example in news weather reports, to continuously select which of two synchronized video inputs will be used, typically based on the chrominance signal of one of those inputs. In this manner, a blue field (or other constant color) behind the weather man is replaced by a satellite map in real time. An analogous process used in film production and photography is commonly referred to as blue-screening, whereby an actor is filmed or photographed in front of a spectrally pure color screen, and is later silhouetted and composited into another filmed scene or photograph.

The chroma-key process, or an analogous chrominance-based or luminance-based digital image processing technique, can be used in accordance with the present invention to generate animated textures in which selected portions of the texture, such as a background behind the likeness of a person, are made transparent when overlaid on a polygon surface, so that the portions of the surface on which the transparent texture is overlaid are not displayed to the viewer. This is discussed more fully below.

When recording an actor, the size of the actor should preferably be kept substantially constant in the eye of the recording camera so that the recorded likeness of the actor will not change size unrealistically when a time-sequenced set of textures are generated from the recording. To the extent that a viewer should perceive a change in an animated character's size corresponding to a change in distance in the virtual world between the animated character and the viewer, this change in size will be provided by the rendering pipeline when rendering an image of the actor.

To provide an animated character whose image appears properly oriented to the viewer, the actor preferably should be filmed from a direction analogous to the anticipated direction of the viewer in the virtual world. Thus, if the anticipated position of the viewer's viewpoint in the virtual world analog of the room boundary 320 shown in FIG. 3 corresponded to point 312, camera 306 would preferably be positioned at that point, or along the line of the actor's trajectory, when recording entry of male actor 302 into the room. As the actor moves closer to the camera, the size of the actor can be kept substantially constant by backing the camera up, or by dynamically zooming the camera. Alternatively, conventional video post-production techniques can be used to normalize the size of the actor. Likewise, to provide a properly oriented image of female actor 304 as she crosses the room along arc 314, the recording camera (e.g., camera 308) preferably should be placed at point 312 at the center of curvature of arc 314, to pan in synchronism with the actor's movements from that point.

Multiple cameras can be used to record the same actor from different angles. Using this technique, a plurality of sets of time-sequenced textures can be generated to provide a realistic image of the actor to the viewer from different viewpoints. The appropriate texture sequence can be selected based on the relative locations of the viewer and the animated character in the virtual world, and the orientation of the surface to which the texture is applied can be kept normal to the viewer, thereby dynamically changing both the animation and the orientation of the surface to disguise the 2-D nature of the animation.

If desired, props and furniture can be provided for the actors incorporated into the texture. For instance, an actor can be placed behind a counter from behind which he pulls a gun. Such props can recorded for later visual display in the virtual world with the texture of the actor, or the prop (e.g., the counter) can be colored so as to be part of the blue-screen background. By blue-screen coloring the counter, the texture of the recorded actor's torso will be truncated so that his image can be realistically displayed in the virtual world pulling a gun from behind a virtual counter modeled and generated by the computer system.

In addition, matched lighting and shadows can be provided as part of the texture to reinforce the illusion of a 3-D character in the virtual world. For example, in cases where the lighting situation into which an animated texture is to be inserted is known, the source imagery for the animated texture can be created with that in mind. If a harsh midday sun is to be simulated in the virtual world, then an actor might be filmed with a lighting setup that effectively emulates that lighting condition. Alternatively, if the final intent is a scene lit by a burning building, then an actor might be lit by diffuse, flickering red and yellow lighting. All elements of intensity, contrast, color, modulation, distribution and direction of light sources illuminating the actors during recording may be manipulated to enhance the blending of the animated texture into a computer synthesized scene.

An animated texture character can be caused to cast a shadow in the virtual world, having a shape consistent with the shape of a shadow that would be thrown by a 3-D being in the real world, by incorporating an actor's real-world shadow into the actor's texture. This can be accomplished, in an exemplary fashion, by placing in the real-world room various models 316 and 318 of objects (such as furniture or walls) that will appear at like positions in the analog room in the virtual world. The model furniture itself need not be incorporated into the texture. The model furniture can be covered in blue screen material when the recording of the actor is made, which captures the actor's shadow on the model furniture. Known video processing techniques can be used to key on the chromaticity and luminosity of the blue-screen material to filter from the texture all but actor and the shadow. A shadow might be represented in a texture map as a black field of some partial transparency. When rendered, the shadow will reduce the luminosity of any portion of an object it obscures.

Another improvement is possible in cases where the animation does not result in significant movement of key points in the texture image (as in the case of a face which talks, but does not tilt, shake, or nod; or as in the case of a simulated screen of a television set). The geometry which underlies the animated texture in these cases does not need to be planar. For instance, 10 to 30 polygons which need not move relative to one another might be used to "sculpt" a virtual world face having a 3-D shape approximating the 3-D shape of a face of a person existing in the real world. An animated texture of that or another person's face could then be placed on this geometric surface, with care taken to align the texture image of the nose with the sculpted geometry of the nose, chin with chin, etc. A conventional projection type mapping algorithm can be used to assign (u,v) texture coordinates from the animated texture to the vertices of the polygons. The character, when viewed straight on, would present the image of the texture as recorded. From the side, a 3-D profile—rather than a foreshortened, flat face—would be seen. Different views of the face thus would be rendered as a function of the viewpoint from which the face is viewed to create an illusion of three-dimensionality of the face in the virtual world.

In accordance with another aspect of the present invention, an animated character may be created using a hybrid of texture animation and conventional model animation techniques. Indeed, in certain circumstances such a hybrid approach results in the most effective use of texture animation. For example, a character may be composed of a body and a head, with the body being modeled by one or more conventionally textured polygons and the head being modeled by one or more polygons to which an animated texture of a face is applied. By texture-animating only the face, the resolution of the texture can be made greater, thus allowing the character's facial expressions to be displayed in greater detail than would be the case if a similarly-sized animated texture were used to display the entire character. This is but one of many possible examples of how the texture animation technique of the present invention can be used in a selective manner to animate realistically a portion of a virtual world character or other entity. As another example, if a character is to perform a hand gesture (e.g., a magician's hand performing a card trick), the magician's hand might be texture-animated while the remaining portions of his body are modeled and textured in a conventional manner. The animated image may comprise only a portion of a larger texture applied to a surface, such that if a single texture is used to image a face, selective portions of the face, such as the eyes or mouth, can be animated independently.

In addition, animated textures can be used in a stereoscopic display. Texture video would be captured in 3-D by two cameras. Two texture animations would be prepared, one from each camera. When an image is rendered, the right camera derived texture is used for the display for the right eye, and the other for the left. When displayed in the virtual world, there would be a particular distance (the real world distance at which the texture was recorded divided by ratio of the camera interocular to the viewer's interocular) at which the convergence would be substantially correct and the 3-D illusion optimized. To minimize animated texture update bandwidth when viewing at some long range where the stereoscopic effect is minimal, the two separate textures can be abandoned for either the right or left singly.

In lieu of a recording of a live being or other object, and further in accordance with the present invention, source imagery for an animated texture can be derived from sequences of cartoon or other drawings. The source imagery for such drawings can be generated by substantially any process. For instance, the drawings could be derived from free-hand artist's sketches or digitized images drawn using a computerized "paint box" or personal computer system running a drawing or CAD program. However created, real-time animated stylistic characters (e.g., cartoon figures) can be introduced using the present invention into a computer graphic virtual world to add to the level of entertainment enjoyed by the viewer in a way that would be inordinately expensive to accomplish using conventional 3-D computer modeling schemes.

Texture animation can make use of substantially any conventional type of texture map available in a graphics subsystem. In a preferred embodiment, animated textures are generated using full color texture maps (i.e. maps defining red, green and blue primary color components for each texel) in conjunction with an alpha "channel" or "plane" to designate a degree of transparency of the texel. The alpha channel allows for effects such as silhouetting, shadows, smokey characters, and dirty window panes.

The choice of texture map type used for animation in a particular computer graphic system may depend on the capabilities of the particular graphics subsystem used. For example, the architecture of the graphics subsystem may constrain the maximum flow of texture data into the rendering pipeline, thus necessitating a trade-off among the number of simultaneous animations, animation size, rate, channels/texel and bits/channel, and possibly other capabilities of the graphics subsystems. In principle, therefore, a texture map type that provides an acceptable aesthetic effect with the lowest amount of texture data possible usually should be selected.

The frequency at which an animated texture is updated (i.e. changed from one time-sequenced texture to the next) need not match the frequency at which a real time computer graphic system updates the surrounding graphic display. For example, a conventional 3-D graphic subsystems may refresh a graphic display at a rate of 50 Hz or 60 Hz, and may update the display at a rate equal to the refresh rate. Such a high update rate is important to providing high speed movement in the virtual world and to avoiding viewer discomfort (a perceived lag between the viewer's head movement and the changing scene can cause nausea). However, this high update rate is more than necessary to provide quality animation. An animation update rate of about 5–10 Hz has been found to provide acceptable results in most cases. As in the art of cartoon animation, the number of different images needed to be generated per second depends on the nature of the action. Slow gestures might be well shown by updating a texture at only a 5 Hz rate, while more rapid gestures might require that texture be updated at a 10–15 Hz rate, or possibly at a rate as high as 20 Hz to 30 Hz for extremely rapid or complex motion.

Neither is the resolution of the animated texture required to match that of the graphic display. Suitable animation, for example, may be achieved using four channel texture maps (e.g., red, green, blue and alpha) having 128×128 texels with 4-bit planes (i.e., 4 bits per texel per channel). Alternatively, even fewer bits per texel could be satisfactory if interpreted in a conventional manner as an index into a color lookup table. In determining the appropriate resolution of the texture, it is necessary to consider the likely relative size of the animated figure with respect to the overall display. If the character will always be small (filling less than a fraction of the screen), a low resolution texture can be used to avoid wasting "texture bandwidth," a term used herein to refer generally to the capacity of a real time computer graphic system to change textures when rendering 3-D images. This is no different than the resolution considerations needed in conventional non-animated texture maps.

Additionally, an animated texture may be created using a time-sequenced set of conventional "MIP" maps. MIP maps are texture maps which contain multiple versions of a texture image that have been successively filtered to have lower spatial frequency, thereby requiring fewer texels and providing a minified representation without visual aliasing. Lower-level-of-detail portions of the map can be progressively substituted for higher-level-of-detail portions as the textured surface extends or moves into the background, thus minimizing aliasing in the texture as it becomes smaller. In accordance with conventional techniques, the relative size of the texels in the generated image can be used to determine which two levels of the MIP map to use for interpolation of any given pixel.

FIG. 4 illustrates an exemplary method for generating a time-sequenced set of textures in accordance with one aspect of the present invention. A video recording of a live actor in a scripted performance is generated by camera 400, and the analog video is captured on an analog or digital video cassette recorder/player 402. Camera 400 may be any type of video camera, although for high-quality textures it is preferred that the camera be an industrial grade, high resolution, three-detector, charge-coupled-device (CCD) camera providing an S-video output. It is further preferred that video cassette recorder/player 402 capture sound simultaneously with video for later use in synchronizing the animated texture of the actor with a reproduced voice or other sound generated by the actor. A conventional S-VHS video cassette recorder/player is suitable for this purpose.

To better separate the frames of the video recording for subsequent digitization, the video recording is played back and re-recorded on a conventional video disk recorder/player 404. Frames of the video recording are then selectively digitized by a conventional digitizer card in a conventional general purpose computer 406. For this purpose, a VidPix model digitizer card installed in a SPARCstation 2 workstation, both commercially available from Sun Microsystems Inc., of Mountain View, Calif., may be used. The computer automates and synchronizes the advance of frames on the video disk recorder/player using a frame control signal output connected by an RS-232 port to the frame advance input of the video disk recorder/player. The frame rate (30 Hz) of the video typically will exceed that required for acceptable animation (which may, as previously explained, only require an update rate of about 5–10 Hz). Accordingly, in such a case only every other or third frame (or some other skip-frame count) is used. Skipping frames can serve another purpose as well. Some interlaced video systems divide frames into multiple fields which, if captured at different times, may introduce some unaesthetic artifacts, in which case the effect of the artifacts may be mitigated by selecting only data from odd or even fields.

The digitizer of process(or) 406 scans each selected frame and divides it into an array of pixels. The digitizer computes three scalar digital values indicative respectively of the luminance (or intensity) of the red, green and blue color components of each pixel, thus creating three arrays (or "channels" or "planes") of digital data for each frame. The digitized frames are then stored in time-sequence order as sequential R-G-B data files 408, meaning that a separate file is created for each frame, with the R-G-B data corresponding to the first selected frame being grouped together as contiguous arrays and stored as the first file of the sequence, the R-G-B data for the next selected frame being grouped together and stored as a second file following the first, and so on.

To mark selected portions of the content of each frame, or to make all or selected portions of each frame translucent (e.g., to represent a ghost or to fade the texture) or wholly transparent, the R-G-B data for each frame are processed by an alpha ($\alpha$) plane generator 410. Alpha plane generator 410 passes the R-G-B data through a series of filters to generate a fourth channel or plane which specifies an alpha value, or code, for each pixel as a function of the luminance and/or chrominance of the pixel. The filtering process is accomplished in the digital domain by software running on a general purpose computer, such as the above-mentioned Sun Microsystems workstation, using well-known linear transform routines to derive a luminance and/or chrominance-based value for each pixel, which is then mapped to a luminance-keyed and/or chroma-keyed color space. For example, to provide basic silhouetting, an area in color space may be designated as "background," and any pixels having a computed chromaticity and/or luminosity value within that area are assigned an alpha value indicative of full transparency. Those pixels falling within an area in color space not classified as background are assigned an alpha value indicative of full or partial opacity. The result is that a fourth digital data array is created for each digitized frame, providing each pixel in a frame with an associated degree of transparency keyed to its chromaticity or luminosity.

The alpha data are added to each of the R-G-B data files, which are then combined and stored again by the workstation in time-sequence order as sequential R-G-B-$\alpha$ data files 412 (which may be separate files or a single integrated file). The workstation then reconfigures the format of the files to provide four separate animated texture files, each file containing one channel of each frame in the animation arranged in time-sequenced order. Thus, for example, one file would contain contiguous arrays of digital data indicative of the red component of the frames in the animation, in time-sequence order. Another file would contain contiguous arrays of digital data indicative of the blue component of the frames in the animation, in the same time-sequence order, and so on for the green and alpha channels. The workstation attaches a header to each file which includes a file name (identifying all four files of an R-G-B-$\alpha$ animated texture by the same name), and parametric information concerning the dimensions of the file, such as the height and width (in texels) and number of frames in the file.

When an animated (or conventional) texture having an alpha channel is rendered by a computer graphics system, each alpha code in the texture map is interpreted by the rendering system as specifying the degree to which the portion of the surface to which the corresponding texel is applied is transparent. Thus, the alpha data specify whether that portion of the surface, if displayed, should fully occlude, only partially obscure, or not occlude or obscure in any way, whatever background (e.g., terrain or other objects) is behind it.

Animated texture files can be included into the run-time database of the computer graphics system, along with geometry/model files 414 (which includes ordinary textures), by a conventional compiler program 416. Although conventional 3-D graphic systems often have dedicated database developmental tools which can be used to generate textures for use with the present invention, a virtual reality system designer may choose to develop additional database tools to assist in creation of the run-time database, including any translation routines necessary to generate data files in the format required by the computer graphic system. Such tools could be readily developed, using known, conventional techniques, by persons of ordinary skill in the art.

Preferably, the animated texture files are then compressed in a conventional manner (e.g., by run-length encoding, or by conventional JPEG compression as shown in FIG. 4, item 418) to reduce the amount of data that must be stored and transferred in and out of secondary storage. When the animated texture files are retrieved from run-time database 110, a complementary decompression process is used to expand the texture data. (Note that the compression/decompression process need not be lossless.)

Various alternatives to the above-described methodology are available for creating animated texture files in accordance with the present invention. For example, a specialized type of video processing device conventionally used in television broadcasts, called a "Video-matter" and commercially available from Ultimatte of Chatsworth, Calif., can be connected between camera 400 and video cassette recorder/player 402 to convert background colors in an analog video signal to ultra-black, thus making it easier to subsequently generate an alpha plane which silhouettes a character. As another example, a computer having a video frame grabber/digitizer card, such as an Apple Macintosh computer, can be connected directly to camera 400 to capture frames of live video, in lieu of using recorders 402 and 404. The captured video can be edited and converted into animated texture files using software programs such as Adobe PhotoShop and Adobe Premier, commercially available from Adobe Systems, Inc. Customized plug-in program modules would be required with these programs to implement an alpha plane generator and to store the R-G-B-α file in the proper sequential format, which readily can be developed by persons of ordinary skill in the art.

As another alternative, the functions of the video frame grabber/digitizer, alpha channel generator and file formatter can be integrated into a high-speed real time system which transfers images from camera 400 directly into a video texture buffer of the interactive 3-D computer graphics system for immediate or delayed use as an animated texture. Using such a technique, or the previously described alternatives, a texture can be generated which portrays an animated photo-likeness of the viewer in the virtual world.

It will be appreciated by those skilled in the art that the present invention can be practiced and implemented by other than the described embodiments, which are presented for purposes of illustration and not of limitation, and the present invention is limited only by the claims which follow:

What is claimed is:

1. A method for animating a rendition of an object situated in a three-dimensional virtual world generated by a computer graphic system, the object including a plurality of surfaces, and the rendition capable of being displayed from a plurality of viewpoints looking into the virtual world from specific positions and orientations, the method comprising the steps of:

storing three-dimensional data representative of the surfaces of the object;

storing data representative of a plurality of time-sequenced textures; and rendering in real time a sequence of images based on the data representative of the surfaces and the data representative of subsequent ones of said succession of textures to display the object relative to different ones of said plurality of viewpoints with selected portions of each said time-sequenced texture mapped respectively to selected surfaces of the object, wherein each said time-sequenced texture depicting the figure in action is used to texture multiple surfaces and is changing at intervals over a period of time so that the changing, selectively-mapped textured surfaces of the object appear to animate the figure, wherein:

the plurality of time-sequenced textures comprises a time-sequenced set of recorded images of at least a portion of an entity existing in the real world; and the plurality of surfaces model an object having a three-dimensional shape approximating the three-dimensional shape of at least that portion of the entity, whereby different perspective views of the texture can be displayed for different ones of the plurality of viewpoints such that the object displayed appears to be an animated three-dimensional likeness of at least that portion of the entity.

2. The method of claim 1, wherein the entity is a person.

3. A method for animating a rendition of a figure in action at a position in a three-dimensional virtual world generated by a three-dimensional computer graphic system, the method comprising the steps of:

storing data representative of a first surface, said data characterizing said first surface as an uneven surface having geometrically modeled features in the form of said figure;

storing data derived from a succession of at least three temporally related source images depicting the figure in action at different moments in time in the form of a succession of at least three time-sequenced textures;

storing three-dimensional data representative of a plurality of other surfaces forming the virtual world; and rendering in real time images of the virtual world based on the three-dimensional data representative of the plurality of other surfaces, and a sequence of images based on the data representative of the first surface and the data representative of subsequent ones of said succession of textures, to display the figure in action in the virtual world on at least a portion of the first surface as texture which changes at intervals over a period of time so that the figure appears animated, wherein each said time-sequenced texture is mapped to said first surface, said mapping providing a projection of said figure in action onto said first surface by which features of said figure in action depicted in said texture are selectively aligned with and displayed with varying perspective on corresponding geometric features of said first surface.

4. The method of claim 3 wherein, between rendering of images of the virtual world, the data representative of the first surface changes to transform geometric features of the first surface, said mapping of time-sequenced textures to said first surface providing a projection of said figure in action onto said first surface by which features of said figure in action depicted in said texture remain aligned with and displayed with varying perspective on corresponding geometric features of said first surface after said transformation.

5. The method of claim 3, further comprising the step of:
capturing sound simultaneously with a recording of said succession of at least three temporally related source images depicting said figure in action for synchronizing the animated textures of the figure in action with reproduced voice or other sound generated by the figure in action.

6. The method of claim 3, further comprising the steps of:
storing data representative of a second surface;
storing data derived from a succession of at least three temporally related source images depicting a second figure in action at different moments in time in the form of a second succession of at least three time-sequenced textures; and
rendering in real time a sequence of images based on the data representative of the second surface and the data representative of subsequent ones of said second succession of textures to display the second figure in action on at least a portion of the second surface as texture which changes at intervals over a period of time so that the second figure appears animated, wherein two texture-animated figures in action are displayed in the virtual world simultaneously.

7. The method of claim 6, wherein the two texture-animated figures in action are displayed in a common scene in the virtual world, and wherein the source images depicting the figures in action are recorded in a setting including at least one of props and furniture which is reproduced in the scene as part of the animated textures or as part of a geometric model used to render the scene.

8. The method of claim 3, wherein:
the succession of time-sequenced textures are derived from a recorded succession of at least three temporally related source images depicting an entity existing in the real world; and
the texture displayed appears to be an animated likeness of the entity.

9. The method of claim 8, wherein the entity is a person.

10. The method of claim 3, wherein:
the succession of textures derives from a succession of at least three temporally related drawings.

11. The method of claim 10, wherein the drawings are cartoon drawings and the texture displayed appears to be an animated cartoon.

12. A method for use by a computer graphic system for rendering a likeness of a real-world living being at a specific three-dimensional position in a computer-generated three-dimensional virtual world, the rendition capable of being displayed from viewpoints having specific positions and orientations within the virtual world, the method comprising the steps of:
storing three-dimensional data representative of a plurality of surfaces modeling an object positioned in the virtual world, the object having a three-dimensional form approximating a three-dimensional form of the being;
storing data representative of a plurality of textures derived from a time-sequenced set of recorded images of the being; and
rendering in real time a sequence of images based on the data representative of the plurality of surfaces and the data representative of subsequent ones of said plurality of textures to display the being relative to different ones of said viewpoints as texture conforming to the three-dimensional form of the object, wherein the texture changes so that the being appears animated, and wherein different perspective views of the texture are displayed for different ones of the plurality of viewpoints such that the object displayed appears to be an animated three-dimensional likeness of the being.

13. The method of claim 12, wherein the live being comprises a person.

14. The method of claim 13, wherein the person is an actor performing a scripted event.

15. The method of claim 12, wherein the live being comprises an animal.

16. The method of claim 12, wherein the being comprises a plant.

* * * * *